(12) United States Patent
Uphaus et al.

(10) Patent No.: US 6,695,350 B2
(45) Date of Patent: Feb. 24, 2004

(54) ROCKER ARM MECHANISM FOR CLAMPING AN ADJUSTABLE STEERING COLUMN

(75) Inventors: Ludiger Uphaus, Neuenkirchen-Vörden (DE); Michael Dannemann, Bremen (DE)

(73) Assignee: Nacam Deutschland GmbH, Lemförde (DE)

( * ) Notice: Subject to any disclaimer, the term of this patent is extended or adjusted under 35 U.S.C. 154(b) by 64 days.

(21) Appl. No.: 10/088,157

(22) PCT Filed: Jul. 12, 2001

(86) PCT No.: PCT/DE01/02538
§ 371 (c)(1),
(2), (4) Date: Mar. 13, 2002

(87) PCT Pub. No.: WO02/08046
PCT Pub. Date: Jan. 31, 2002

(65) Prior Publication Data
US 2003/0127843 A1 Jul. 10, 2003

(30) Foreign Application Priority Data
Jul. 24, 2000 (DE) .......................................... 100 36 384

(51) Int. Cl.⁷ ................................................ B62D 1/18
(52) U.S. Cl. ........................................ 280/775; 74/493
(58) Field of Search .......................... 280/775; 74/493; 403/374.3

(56) References Cited

U.S. PATENT DOCUMENTS

| | | | | |
|---|---|---|---|---|
| 3,335,619 A | * | 8/1967 | Curran ......................... | 74/495 |
| 4,102,218 A | * | 7/1978 | Naka et al. .................. | 74/493 |
| 4,279,176 A | * | 7/1981 | Minamitani ................. | 74/493 |
| 4,291,896 A | * | 9/1981 | Koch .......................... | 280/775 |
| 4,656,888 A | * | 4/1987 | Schmitz ....................... | 74/493 |
| 4,753,121 A | * | 6/1988 | Venable et al. ............... | 74/493 |
| 4,774,851 A | * | 10/1988 | Iwanami et al. .............. | 74/493 |
| 4,958,852 A | * | 9/1990 | Kohno et al. ................ | 280/775 |
| 5,009,629 A | * | 4/1991 | Tagawa ........................ | 474/80 |
| 5,213,004 A | | 5/1993 | Hoblingre ...................... | 74/493 |
| 5,377,555 A | * | 1/1995 | Hancock ....................... | 74/493 |
| 5,481,938 A | * | 1/1996 | Stuedemann et al. .......... | 74/493 |
| 5,570,610 A | * | 11/1996 | Cymbal ......................... | 74/493 |
| 5,676,081 A | * | 10/1997 | Kobelt .................... | 114/144 R |
| 5,931,501 A | | 8/1999 | Baumann et al. ........... | 280/775 |

FOREIGN PATENT DOCUMENTS

| | | |
|---|---|---|
| DE | 44 00 306 A | 7/1994 |
| DE | 196 38 282 C1 | 2/1998 |
| EP | 0 345 101 | 4/1989 |

\* cited by examiner

Primary Examiner—Paul N. Dickson
Assistant Examiner—Laura B. Rosenberg
(74) Attorney, Agent, or Firm—McGlew and Tuttle, P.C.

(57) ABSTRACT

A tilting pin mechanism is provided, preferably for the clamping device of a motor vehicle steering column, whose position is adjustable, for detachably fixing a housing accommodating the steering column at a bracket that is a rigid part of the body. The housing and the bracket have at least one cooperating friction surface pair that can be pressed against each other by means of the tilting pin mechanism. The tilting pin mechanism includes a centrally arranged bolt which is displaceable in the direction of its central longitudinal axis and with at least one tilting pin whose longitudinal axis is arranged approximately in parallel to the central longitudinal axis of the bolt. The tilting pin is supported on one side directly or indirectly at a bolt collar and is accommodated at its other end in a recess on the front side of an actuating ring. The tilting pin can be tilted into a lockable stop position and in the opposite direction into a release position by rotating the actuating ring beyond the axial extended position in parallel to the central longitudinal axis of the bolt. The actuating ring has at least one recess for an additional tilting pin on the second front side facing away from the first tilting pin. The other end of this tilting pin is supported in a thrust washer that is axially displaceable in the direction of the central axis of the actuating ring.

13 Claims, 4 Drawing Sheets

ROCKER ARM MECHANISM FOR CLAMPING AN ADJUSTABLE STEERING COLUMN

FIELD OF THE INVENTION

The present invention pertains to a tilting pin mechanism for the clamping device of a motor vehicle steering column, whose position can be adjusted, for detachably fixing a housing accommodating the steering column at a bracket that is a rigid part of the body, wherein the housing and the bracket have at least one cooperating friction surface pair that can be pressed against each other by means of the tilting pin mechanism, with a centrally arranged bolt which is displaceable in the direction of its central longitudinal axis and with at least one tilting pin having a longitudinal axis arranged approximately in parallel to the central longitudinal axis of the bolt.

BACKGROUND OF THE INVENTION

Such a tilting pin mechanism is present, e.g., to build up the clamping forces in a clamping device corresponding to DE 44 00 306 A1. This specification discloses a clamping device, by which a housing accommodating the steering column is in contact with a bracket that is a rigid part of the body in the clamped state with corresponding friction surfaces. The clamping forces are built up by means of a plurality of tilting pins, which are supported with one end in an abutment at the housing and with their other end in an abutment at a bolt collar. The rotation of the bolt in one direction causes that the tilting pins can be brought into a locking stop position beyond an axial extended position in parallel to the axis of the bolt, in which stop position the necessary pressing forces are applied for the friction surfaces arranged between the bracket, which is a rigid part of the body, and the housing. During the rotation of the bolt in the opposite direction, the tilting pins come into a release position, in which the clamping connection is abolished and in which the tilting pins are sloped at a small angle in relation to the longitudinal axis of the bolt.

The clamping device described in the above-mentioned document, using a tilting pin mechanism, has proved, in principle, to be successful, but it has certain drawbacks, especially in regard to increased requirements on the clamping action. These are especially that the clamping path, i.e., the travel performed by the tilting pins from their release position into the locking position, is relatively short. In addition, due to the fact that the position of the tilting pin passes over beyond the axial extended position into a locking position, some of the theoretically existing clamping path, which is short anyway, is lost due to the fact that the tilting pins are held in the stable locking position. The fact that an abutment, e.g., in the form of an axial needle bearing, which permits the rotary movement of the actuating element to tilt off the tilting pin under force, is necessary for the tilting pin mechanism in question in the existing state of the art, has turned out to be another drawback.

SUMMARY AND OBJECTS OF THE INVENTION

The object of the present invention is therefore to improve a tilting pin mechanism of the type described in the introduction, such that longer clamping paths can be obtained. In addition, the mechanism according to the present invention shall have compact dimensions, it shall have a simple design and be inexpensive to manufacture.

According to the invention, a tilting pin mechanism is provided, preferably for the clamping device of a motor vehicle steering column, whose position is adjustable, for detachably fixing a housing accommodating the steering column at a bracket that is a rigid part of the body. The housing and the bracket have at least one cooperating friction surface pair that can be pressed against each other by means of the tilting pin mechanism. The tilting pin mechanism includes a centrally arranged bolt which is displaceable in the direction of its central longitudinal axis and with at least one tilting pin whose longitudinal axis is arranged approximately in parallel to the central longitudinal axis of the bolt. The tilting pin is supported on one side directly or indirectly at a bolt collar and is accommodated at its other end in a recess on the front side of an actuating ring. The tilting pin can be tilted into a lockable stop position and in the opposite direction into a release position by rotating the actuating ring beyond the axial extended position in parallel to the central longitudinal axis of the bolt. The actuating ring has at least one recess for an additional tilting pin on the second front side facing away from the first tilting pin. The other end of this tilting pin is supported in a thrust washer that is axially displaceable in the direction of the central axis of the actuating ring.

According to this technical teaching, the actuating ring, which brings about the tilting off of the tilting pins fitted in between the actuating ring and a bolt collar during rotation, has at least one recess for an additional tilting pin on the second front side facing away from the first-named tilting pins, wherein the other end of this additional tilting pin is supported in a thrust washer that is axially displaceable in the direction of the central axis of the actuating ring.

Due to this design according to the present invention, rotation of the actuating ring brings about a bilateral lifting movement of the tilting pins mounted in the front sides of the actuating ring. The travel can thus be doubled compared with the tilting pin mechanisms known from the state of the art. Since the recesses for the tilting pin or for the tilting pins arranged in both front sides are arranged offset in relation to one another, the mechanism according to the present invention has extremely compact dimensions despite the doubling of the travel.

It proved to be particularly advantageous to arrange two mounts so as to be offset by 180° in relation to one another for one tilting pin each at each of the two front sides of the actuating ring. The mounts at one front side are arranged offset by 90° in relation to those of the other front side. The bilaterally offset arrangement of the needle pairs stabilizes the middle actuating ring, as a result of which the number of tilting pins, which is usually three, can be reduced, which simplifies the manufacture and the assembly.

Moreover, provisions are made in another advantageous embodiment of the subject of the present invention that only two of the tilting pins present are in the "over-the-dead-center position," i.e., beyond the axial extended position in parallel to the central longitudinal axis of the bolt, in the lockable stop position of the actuating ring, whereas the other two tilting pins are arranged exactly in the axial extended position. Due to the different arrangement of the tilting pins in the locking position, the clamping path can be additionally increased and the clamping action of the entire mechanism can thus be increased.

The rotation of the actuating ring can be brought about by coupling the actuating ring with a hand lever.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
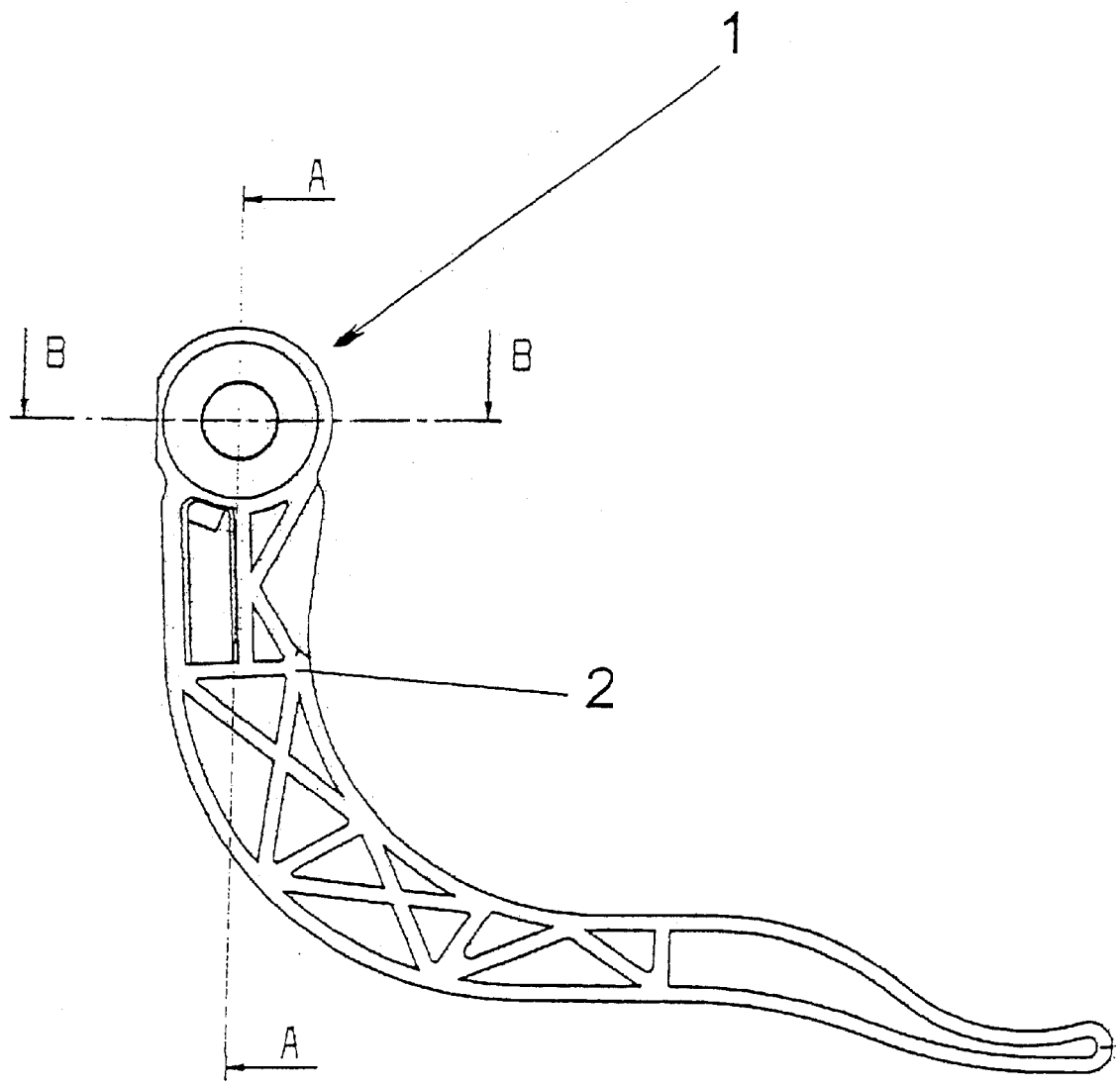
FIG. 1 is a side view of the tilting pin mechanism according to the present invention.
Figure 2:
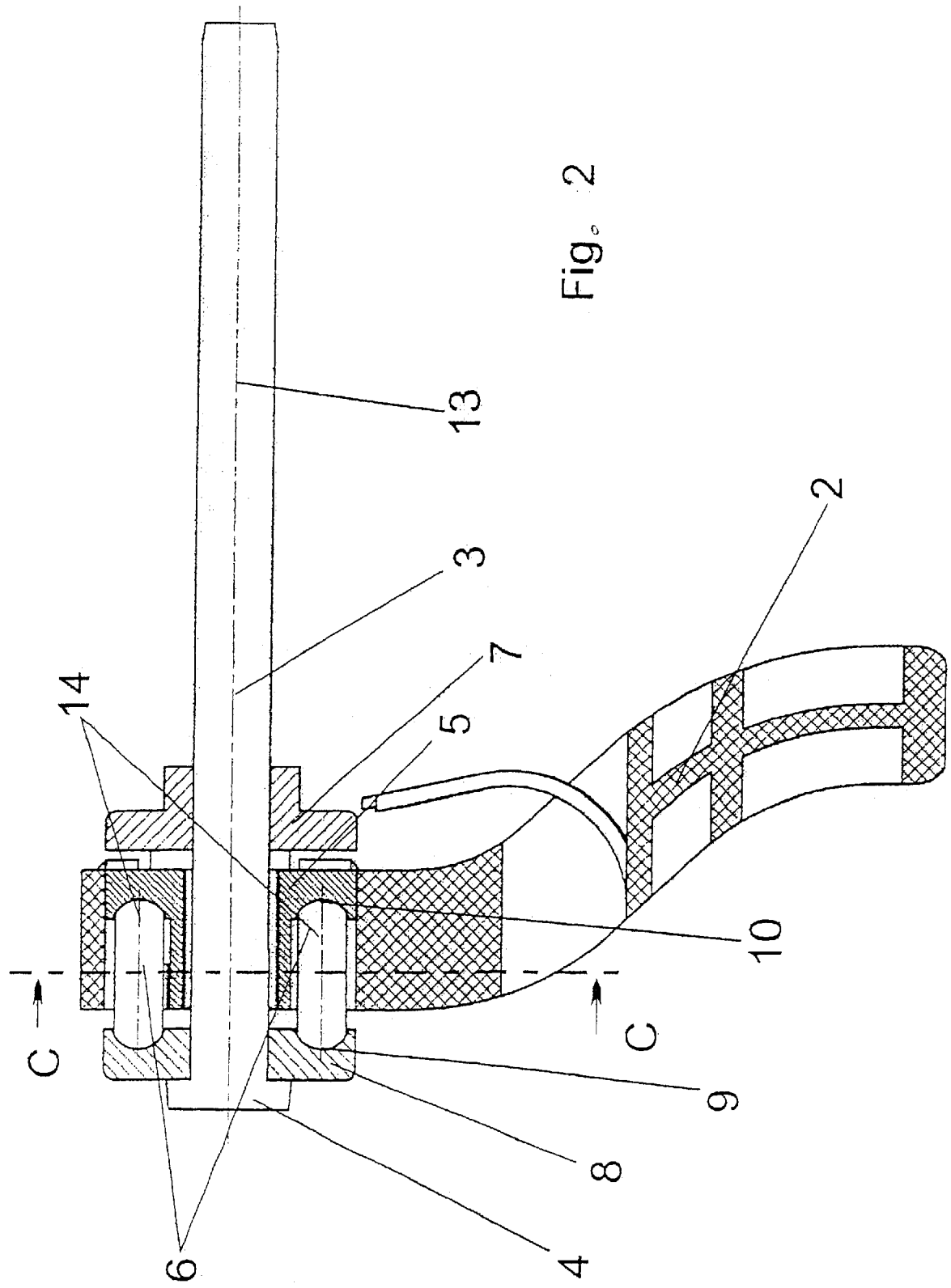
FIG. 2 is a sectional view through the mechanism according to the present invention corresponding to the section line A—A in FIG. 1.

Referring to the drawings in particular, adjoining components of the steering column tilting pin mechanism are not shown in the view of the tilting pin mechanism in the individual drawings for the sake of clarity. FIG. 1 shows the tilting pin mechanism, designated by 1 in its entirety, together with a hand lever 2 coupled with the tilting pin mechanism 1. The hand lever 2 is used to actuate the tilting pin mechanism, whose detailed design is illustrated on the basis of FIGS. 2 through 4.

The entire mechanism comprises essentially a centrally arranged bolt 3 with an end-side bolt collar 4, an actuating ring 5, to which the hand lever 2 is fastened, a total of four tilting pins 6, as well as two thrust washers 7 and 8 arranged on the side of the actuating ring 5. With its outside facing away from the tilting pins, the thrust washer 8 is in contact with the bolt collar.4. Spherical recesses 9, whose contours are adapted to the end of the tilting pins 6, are present in the thrust washer 8. With their ends facing away from the thrust washer 8, the tilting pins 6 are arranged in corresponding recesses 10 of the actuating ring 5, which are designed as ball sockets. In the exemplary embodiment being shown, the thrust washer 8 acts as a contact surface for two tilting pins, wherein the tilting pins are arranged on a common radius offset by 180°.

Figure 3:
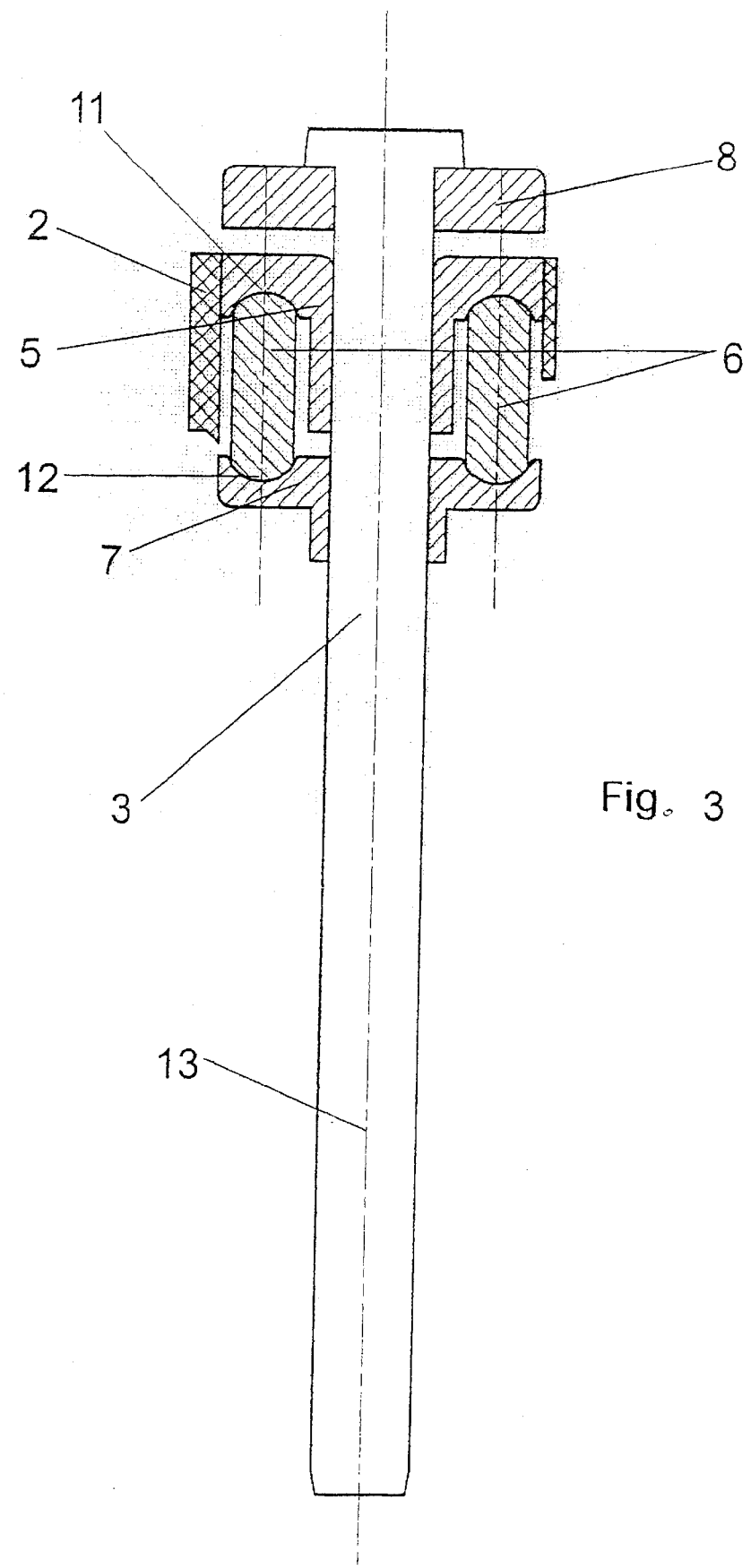
FIG. 3 is a sectional view through the tilting pin mechanism corresponding to section line B—B in FIG. 1.
Figure 4:
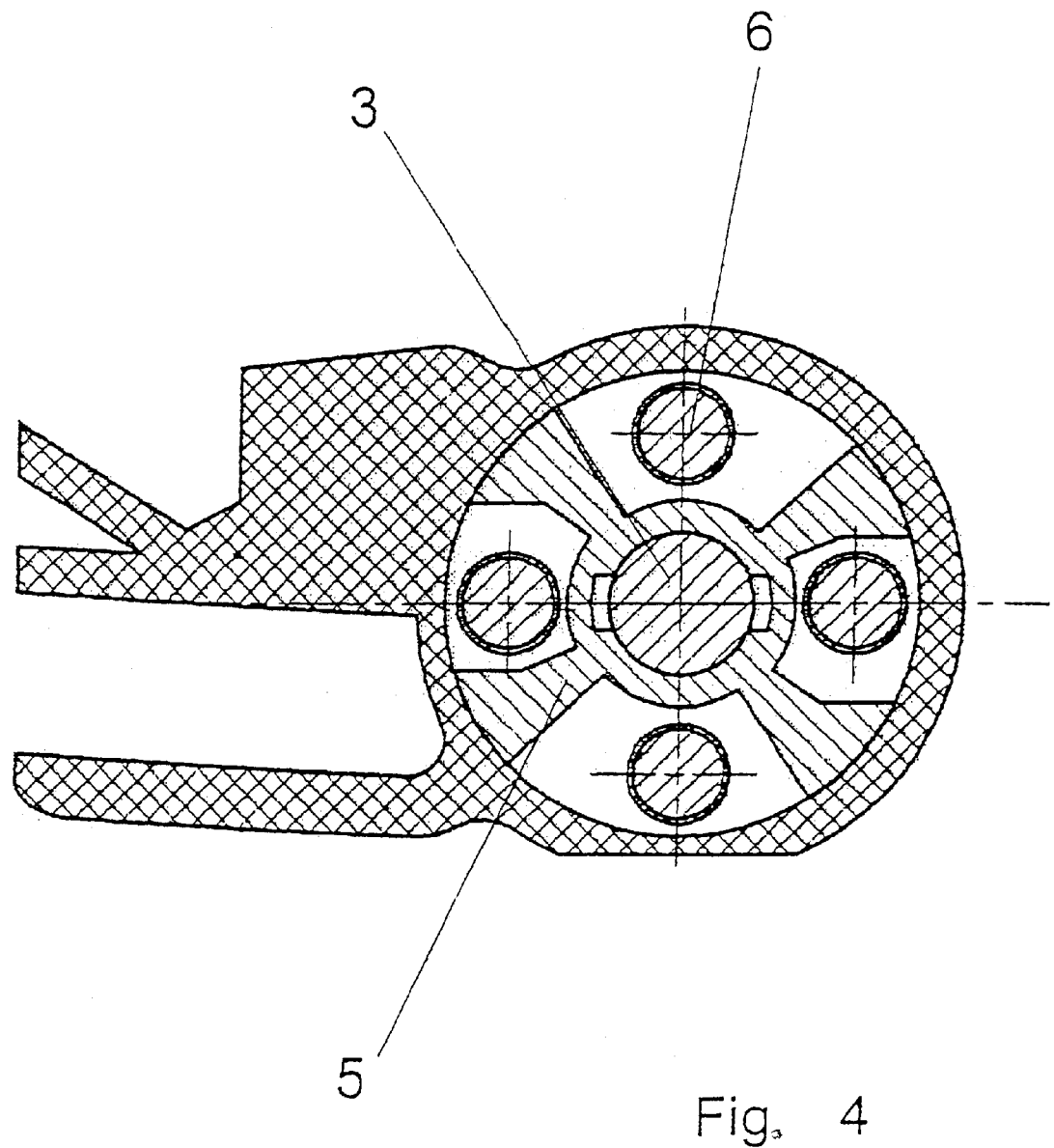
FIG. 4 is a sectional view corresponding to section line C—C in FIG. 2.

The view in FIG. 3 shows that on the front side that faces away from the thrust washer 8, the actuating ring 5 likewise has, moreover, two recesses 11, in which tilting pins 6 are again accommodated. These tilting pins 6 are supported, on the one hand, at the bottoms of the recesses 11, which are designed as ball sockets analogously to the recesses 10. The other end of the tilting pins 6 is supported on the thrust washer 7, which likewise has recesses 12 of a hemispherical design corresponding to the end of the tilting pins 6, analogously to the thrust washer 8. The diameters of the recesses 10 and 11 are selected to be such that the tilting pins are arranged in the holes with a slight angular offset but essentially in parallel to the central longitudinal axis 13 of the bolt 3. Rotation of the actuating ring 5 by means of the hand lever 2 causes the slightly obliquely positioned tilting pin 6 to be brought first into a position in which their longitudinal axes 14 are directed in parallel to the central longitudinal axis 13 of the bolt 3. Further rotation of the actuating ring 5 then causes the tilting pins to be brought into a corresponding stable stop position beyond the above-mentioned parallel alignment.

Due to the fact that rotation of the actuating ring 5 brings about a change in position and, as a result of this, a lifting movement of the tilting pins 6 being moved by the actuating ring 5, the travel is doubled compared with prior-art tilting pin mechanisms and the possible clamping forces generated by the tilting pin mechanism for the detachable fastening of an adjustable steering column are substantially increased as a result.

The view in FIG. 4 shows clearly once again that two tilting pins 6 projecting from a front side of the actuating ring 5 are arranged offset by 180° on a common circumferential radius, and the tilting pins 6 of the opposite front side arc arranged offset by 90° in relation to the first ones. This arrangement leads to a self-stabilization of the tilting pin mechanism, so that the hitherto common design with three tilting pins on a common circumferential radius can be eliminated.

The lifting movement of the tilting pins 6 brings about an axial displacement of the thrust washers 7 and 8, as a result of which holding forces can be built up within the clamping mechanism for a motor vehicle longitudinal steering column within the friction pairs present there in a manner that is not shown here.

Provisions are made in a special embodiment of the subject of the present invention to use only two of the four existing tilting pins 6 for locking the tilting pins in the clamped position. This means that two tilting pins 6 are in the over-the-dead-center position in the locking position of the tilting pin mechanism, whereas the longitudinal axes 14 of the other two tilting pins are directed in parallel to the central longitudinal axis 13 of the bolt 3. The travel of these tilting pins 6 is therefore not reduced by the over-the-dead-center position as a consequence of the locking, so that the lifting is increased, albeit slightly, compared with the exemplary embodiment described first.

While specific embodiments of the invention have been shown and described in detail to illustrate the application of the principles of the invention, it will be understood that the invention may be embodied otherwise without departing from such principles.

What is claimed is:

1. A motor vehicle steering column tilting pin mechanism comprising:

a centrally arranged bolt which is displaceable in the direction of a central longitudinal axis, said bolt having a bolt collar;

a first tilting pin having a longitudinal axis, said first tilting pin being arranged approximately in parallel to the central longitudinal axis of said bolt, said first tilting pin being supported on one end directly or indirectly at said bolt collar;

an actuating ring having a recess on a front side, said first tilting pin being accommodated at another end in said recess of said actuating ring, said first tilting pin being tilted into a lockable stop position corresponding to a lockable stop position of said actuating ring and in an opposite direction into a release position by rotating said actuating ring beyond an axial extended position of said first tilting pin in parallel to the central longitudinal axis of said bolt;

an additional tilting pin, said actuating ring having another recess for said additional tilting pin on a second front side facing away from said first tilting pin;

a thrust washer, another end of said additional tilting pin being supported in said thrust washer that is axially displaceable in the direction of the central axis of said actuating ring.

2. A tilting pin mechanism in accordance with claim 1, wherein said recess and said another recess form two mounts for one said tilting pin each are arranged offset by 180° in relation to one another on each of the two front sides of said actuating ring.

3. A tilting pin mechanism in accordance with claim 2, wherein said mounts on one front side are arranged offset by 90° in relation to those of the other front side.

4. A tilting pin mechanism in accordance with claim 3, wherein in a lockable stop position of said actuating ring said first tilting pin arranged on one front side is in the axial extended position in parallel to said central longitudinal axis of said bolt.

5. A tilting pin mechanism in accordance with claim 3, wherein one of said tilting pins arranged on one front side is in the axial extended position in parallel to said central longitudinal axis of said bolt in the lockable stop position of said actuating ring.

6. A tilting pin mechanism in accordance with claim 2, wherein in the lockable stop position of said actuating ring said first tilting pin arranged on one front side is in the axial extended position in parallel to said central longitudinal axis of said bolt.

7. A tilting pin mechanism in accordance with claim 2, wherein one of said tilting pins arranged on one front side is in the axial extended position in parallel to said central longitudinal axis of said bolt in the lockable stop position of said actuating ring.

8. A tilting pin mechanism in accordance with claim 2, wherein in the lockable stop position of said actuating ring, at least one of said tilting pins is located in the axial extended position in parallel to said central longitudinal axis of the said bolt.

9. A tilting pin mechanism in accordance with claim 1, wherein in the lockable stop position of said actuating ring, at least one of said tilting pins is located in the axial extended position in parallel to said central longitudinal axis of said bolt.

10. A tilting pin mechanism in accordance with claim 9, wherein in a lockable stop position of said actuating ring said first tilting pin arranged on one front side is in the axial extended position in parallel to said central longitudinal axis of said bolt.

11. A tilting pin mechanism in accordance with claim 9, wherein one of said tilting pins arranged on one front side is in the axial extended position in parallel to said central longitudinal axis of said bolt in the lockable stop position of said actuating ring.

12. A tilting pin mechanism in accordance with claim 1, further comprising a hand lever, wherein said actuating ring is coupled with said hand lever for performing a rotary movement.

13. A tilting pin mechanism comprising:
   a bolt having central longitudinal axis and a bolt collar, said bolt being displaceable along a direction of the central longitudinal axis;
   a first side tilting pin having a longitudinal axis, said first side tilting pin being arranged approximately in parallel to the central longitudinal axis, said first side tilting pin having a bolt collar end supported directly or indirectly by said bolt collar;
   an actuating ring having a first side recess on a first side, said first side tilting pin having an actuating ring end accommodated in said first side recess of said actuating ring, said first side tilting pin being tilted into a lockable stop position corresponding to a lockable stop position of said actuating ring and in an opposite direction into a release position by rotating said actuating ring beyond an axial extended position of said first side tilting pin in parallel to the central longitudinal axis;
   a second side tilting pin, said actuating ring having a second side recess on a second side, said second side tilting pin having an actuating ring end accommodated in said second side recess;
   a thrust washer, said second side tilting pin having a trust washer end supported in said thrust washer, said thrust washer being axially displaceable in the direction of the central axis.

* * * * *